(12) United States Patent
Hegedus et al.

(10) Patent No.: US 11,041,043 B2
(45) Date of Patent: Jun. 22, 2021

(54) POLYCARBAMIDE RESINS FOR METAL COATING APPLICATIONS

(71) Applicant: Evonik Operations GmbH, Essen (DE)

(72) Inventors: Charles Raymond Hegedus, Allentown, PA (US); Sudhir Ananthachar, Hillsborough, NJ (US); Thomas T. Corby, Roseto, PA (US); Shafiq Fazel, Allentown, PA (US)

(73) Assignee: Evonik Operations GmbH, Essen (DE)

(*) Notice: Subject to any disclaimer, the term of this patent is extended or adjusted under 35 U.S.C. 154(b) by 75 days.

(21) Appl. No.: 16/072,976

(22) PCT Filed: Feb. 13, 2017

(86) PCT No.: PCT/IB2017/000225
§ 371 (c)(1),
(2) Date: Jul. 26, 2018

(87) PCT Pub. No.: WO2017/137850
PCT Pub. Date: Aug. 17, 2017

(65) Prior Publication Data
US 2019/0031814 A1 Jan. 31, 2019

Related U.S. Application Data

(60) Provisional application No. 62/294,550, filed on Feb. 12, 2016.

(51) Int. Cl.
| | | |
|---|---|---|
| *C08G 18/66* | (2006.01) | |
| *C08G 18/79* | (2006.01) | |
| *C09D 175/06* | (2006.01) | |
| *C08G 18/38* | (2006.01) | |
| *C08G 18/42* | (2006.01) | |
| *C08G 18/08* | (2006.01) | |
| *C08G 18/32* | (2006.01) | |
| *C08K 3/22* | (2006.01) | |
| *C08K 5/07* | (2006.01) | |
| *C09D 5/08* | (2006.01) | |

(52) U.S. Cl.
CPC ..... *C08G 18/6651* (2013.01); *C08G 18/0852* (2013.01); *C08G 18/3203* (2013.01); *C08G 18/3225* (2013.01); *C08G 18/3821* (2013.01); *C08G 18/423* (2013.01); *C08G 18/4238* (2013.01); *C08G 18/792* (2013.01); *C08K 3/22* (2013.01); *C08K 5/07* (2013.01); *C09D 5/08* (2013.01); *C09D 175/06* (2013.01); *C08G 2150/90* (2013.01); *C08K 2003/2241* (2013.01)

(58) Field of Classification Search
CPC ............ C08G 18/6651; C08G 18/3821; C08G 18/4238; C08G 18/0852; C08G 18/423; C08G 18/3203; C08G 18/3225; C08G 18/792; C08G 2150/90; C08K 3/22; C08K 5/07; C08K 2003/2241; C09D 5/08; C09D 175/06
See application file for complete search history.

(56) References Cited

U.S. PATENT DOCUMENTS

| | | | |
|---|---|---|---|
| 5,236,741 A | 8/1993 | Zwiener et al. | |
| 10,370,559 B2* | 8/2019 | Hohnholz | C09D 167/04 |
| 2006/0155053 A1* | 7/2006 | Lenges | C08G 18/3821 |
| | | | 524/589 |
| 2007/0100112 A1* | 5/2007 | Sarpeshkar | C08G 18/10 |
| | | | 528/44 |
| 2013/0289134 A1* | 10/2013 | Hans | C08G 59/184 |
| | | | 514/772.1 |
| 2014/0194571 A1* | 7/2014 | Weijnen | C08G 18/6651 |
| | | | 524/778 |
| 2017/0298171 A1* | 10/2017 | Johnston | C08G 18/3821 |

FOREIGN PATENT DOCUMENTS

| | | |
|---|---|---|
| EP | 2080790 A1 | 7/2009 |
| EP | 2744840 A2 | 6/2014 |
| WO | 2015120941 A1 | 8/2015 |

OTHER PUBLICATIONS

Carl Angeloff, P.E., et al; Two-Component Aliphatic Polyurea Coatings for High Productivity Applications; Journal of Protective Coatings & Linings; Retrieved from Internet: https://www.paintsquare.com/library/articles/Two_Component_Aliphatic_Polyurea_Coatings_for_High_Productivity_Applications.pdf ; Aug. 2002; pp. 42-47 (6 pages).
PCT International Search Report dated Jun. 19, 2017 corresponding to PCT Application No. PCT/IB2017/000225 filed Feb. 13, 2017 (4 pages).

* cited by examiner

*Primary Examiner* — Rabon A Sergent
(74) *Attorney, Agent, or Firm* — Andrew H. Chung; Linda S. Li; Jason S. Ngui

(57) ABSTRACT

Polycarbamide coating compositions and secondary diamine curing agents used to produce the coating compositions are disclosed. Curing agent compositions comprising: (a) the reaction product of bis(4-aminocyclohexyl) methane and ethyl ester of 2-butendioc acid; and (b) the reaction product of bis(4-amino-3-methylcyclohexyl)methane and ethyl ester of 2-butendioic acid; and (c) at least one polyol are also disclosed. One aspect of the disclosure relates to a non-aqueous coating composition comprising the disclosed amine curing agents with a polyisocyanate resin. The coating compositions are suitable for use as direct to metal coatings or top coats. Methods of producing the curing agents and the coating compositions are also disclosed.

21 Claims, 16 Drawing Sheets

PCA1 composition

| Ingredients | Details | Weight % |
|---|---|---|
| Secondary diamine A | A reaction product of bis(4-aminocyclohexyl)methane and ethyl ester of 2-butendioic acid | 33.34 |
| Secondary diamine B | A reaction product of bis(4-amino-3-methylcycohexyl)methane and ethyl ester of 2-butendioic acid | 33.33 |
| Polyol | Polyester polyol | 33.34 |

FIG. 1

PCB1 composition

| Ingredients | Details | Weight % |
|---|---|---|
| Secondary diamine A | A reaction product of bis(4-aminocyclohexyl)methane and ethyl ester of 2-butendioic acid | 66 |
| Secondary diamine B | A reaction product of bis(4-amino-3-methylcycohexyl)methane and ethyl ester of 2-butendioic acid | 17 |
| Polyol | Polyester polyol | 17 |

FIG. 2

Clearcoat with PCA1

| Raw material | Weight |
|---|---|
| PC A1 | 100 |
| MAK | 44 |
| (HDiT or HDI trimer N3300) | 78 |
| Total | 222 |
| Theoretical results | |
| Weight solids | 80.18% |
| Volume Solids | 74.69 |
| VOC | 1.73 Lb/Gal (0.207 kg/L) |
| NCO:OH | 1.05 |

FIG. 3

Clearcoat with PCB1

| Raw material | Weight |
|---|---|
| PC B1 | 100 |
| MAK | 44 |
| (HDiT or HDI trimer N3300) | 78 |
| Total | 222 |
| Theoretical results | |
| Weight solids | 80.18% |
| Volume Solids | 74.51 |
| VOC | 1.72 Lb/Gal (0.206 kg/L) |
| NCO:OH | 1.05 |

FIG. 4

Physical Testing – Clear Coat Formulation

| Property | PC A1 Clearcoat | PC B1 Clearcoat |
|---|---|---|
| VOC at application (Lb/Gallon) | 1.72 (0.206 kg/L) | 1.72 (0.206 kg/L) |
| Admixed viscosity (Zahn #2, sec) | 28 | 28 |
| Dry times (STT, TF, DH, TC) (hr) | 1, 4, 8, 11 | 0.2, 0.5, 0.6, 1.0 |
| Gloss (60°) | 93 | 93 |
| QUV B, 1000 hrs, 60° gloss Ret. / ΔE | 93 / 0.8 | 90 / 0.4 |
| Water immersion (24 hr immersion) | Pass | Pass |
| Tape adhesion (dry, wet) | 5A, 5A | 5A, 5A |
| Direct / reverse impact flex (in-lbs) | 160/160 (18.1/18.1 N-m) | 160/160 (18.1/18.1 N-m) |
| Mandrel bend (in) | Pass 1/8 (0.318 cm) | Pass 1/8 (0.318 cm) |
| Persoz hardness | 135 | 129 |
| MEK & toluene immersion (24 hr) | Pass | Pass |

FIG. 5

Pigmented Top Coat with PCA1

| Raw Material | Weight |
|---|---|
| PC A1 | 348 |
| TiO2 | 347.8 |
| MAK | 153 |
| HDI trimer (HDiT) | 271 |
| Total | 1120 |
| PVC% | 17 |
| Volume Solids% | 77.5 |
| Weight Solids % | 86.5 |
| VOC(g/l) | 183 |

FIG. 6

Pigmented Top Coat with PCB1

| Raw Material | Weight |
|---|---|
| PCB1 | 348 |
| TiO2 | 347.8 |
| MAK | 153 |
| HDI trimer (HDiT) | 271 |
| Total | 1120 |
| PVC% | 17 |
| Volume Solids% | 77.5 |
| Weight Solids % | 86.5 |
| VOC(g/l) | 183 |

FIG. 7

Physical Testing - Pigmented Top Coat

| Property | PCA1 Topcoat | PC B1 Top coat |
|---|---|---|
| VOC at application (g/L) | 200 | 200 |
| Admixed viscosity (Zahn #2, sec) | 28 | 28 |
| Dry times (STT, TF, DH, TC) (hr.) STT= Set to touch, TF=Tack free, DH= Dry Hard TC= Through cure. | 0.5, 4.0, 5.0, 7 | 0.3, 0.5, 0.8, 1 |
| Gloss (60°) | 86 | 84 |
| QUV B, 1000 hrs, 60° gloss Ret. / $\Delta E$ | 84 / 0.4 | 82/0.4 |
| Tape adhesion (dry, wet) | 5A, 5A | 5A, 5A |
| Direct / reverse impact flex (in-lbs) | 160 / 140 (18.1/15.8 N-m) | 160/140 (18.1/15.8 N-m) |
| Mandrel bend (in) | Pass 1/8 (0.318 cm) | Pass 1/8 inch (0.318 cm) |
| Persoz hardness | 161 | 168 |
| MEK & toluene immersion (24 hr) | Pass | Pass |

FIG. 8

DTM Formulation with PCA1

| Raw material | Weight |
|---|---|
| PCA1 | 348 |
| TiO2 | 287 |
| Heucophos ZAPP | 60.8 |
| MAK | 153 |
| HDI trimer (HDiT) | 271 |
| Total | 1120 |
| PVC% | 17 |
| Volume Solids% | 77.5 |
| Weight Solids % | 86.5 |
| VOC(g/l) | 183 |

FIG. 9

DTM Formulation with PCB1

| Raw material | Weight |
|---|---|
| PCB1 | 348 |
| TiO2 | 287 |
| Heucophos ZAPP | 60.8 |
| MAK | 153 |
| HDI trimer (HDiT) | 271 |
| Total | 1120 |
| PVC% | 17 |
| Volume Solids% | 77.5 |
| Weight Solids% | 86.5 |
| VOC(g/l) | 183 |

FIG. 10

Physical Testing – DTM Formulation

| Property | PCA1 DTM | PCB1 DTM |
|---|---|---|
| VOC at application (g/L) | 200 | 200 |
| Admixed viscosity (Zahn #2, sec) | 28 | 28 |
| Dry times (STT, TF, DH, TC) (hr) | 0.5, 4.0, 5.0, 7 | 0.3, 0.5, 0.8, 1 |
| Gloss (60°) | 86 | 89.5 |
| QUV B, 1000 hrs, 60° gloss Ret. / ΔE | 84 / 0.5 | 85 / 0.5 |
| Water immersion (24 hr immersion) | Pass | Pass |
| Tape adhesion (dry, wet) | 5A, 5A | 5A, 5A |
| Direct / reverse impact flex (in-lbs) | 160/160 (18.1/18.1 N-m) | 160/160 (18.1/18.1 N-m) |
| Mandrel bend (in) | Pass 1/8" (0.318 cm) | Pass 1/8" (0.318 cm) |
| Persoz hardness | 196 | 191 |
| MEK & toluene immersion (24 hr) | Pass | Pass |

FIG. 11

Physical Properties of PCA1 and PCB1

| Properties | PCA1 | PCB1 |
|---|---|---|
| Amine Equivalent Weight (g/eq) | 256 | 267 |
| Viscosity @ 25°C (mPa-s) | 1734 | 1500 |
| Density | 1.08 | 1.07 |
| Color (APHA) | <50 | <50 |
| Tg °C 7 day cure at 25°C | 55 | 53 |

FIG. 12

Physical Properties of Typical Polyisocyanate Resin

| Properties | Aliphatic polyisocynate resin |
|---|---|
| Color (APHA) | <40 |
| Viscosity @ 25°C (mPa-s) | 2500 |
| Specific gravity | 1.13 |
| Solids content % | 100 |
| VOC content | 0 (g/L) |
| NCO content % | 21.8 |
| Average functionality | 3-4 |

FIG. 13

Gel Times for Clear Coats with PCA1/PCB1

| Polycarbamide | Gel time @ 25°C (min) |
|---|---|
| PCB1 / HDI Trimer / MAK | 22 |
| PCA1 / HDI Trimer / MAK | 64 |

FIG. 14

Properties of PCA1/PCB1 DTM Coatings vs. Polyurethane DTM Coatings

| Property | PCA1 DTM | PCB1 DTM | 2K Commercial Polyurethane (DTM) |
|---|---|---|---|
| VOC at application (g/L) | 200 | 200 | 317 |
| Admixed viscosity (Zahn #2, s) | 28 | 28 | 28 |
| Dry times (STT, TF, DH, TC) (h) STT= Set to touch, TF=Tack free, DH= Dry Hard, TC= Through cure. | 0.5, 4.0, 5.0, 7.0 | 0.3, 0.5, 0.8, 1.0 | 1.0, 2.5, 3.0, >14 |
| Gloss (60°) | 86 | 89.5 | 90 |
| QUV B, 1000 h-, 60° gloss ret. / $\Delta E$ | 84 / 0.5 | 85 / 0.5 | 80 / 1.5 |
| Water immersion (24 h immersion) | Pass | Pass | Pass |
| Tape adhesion (dry, wet) | 5A, 5A | 5A, 5A | 5A, 5A |
| Direct / reverse impact flex (in-lbs) | 160 / 160 (18.1/18.1 N-m) | 160 / 160 (18.1/18.1 N-m) | 160 / 160 (18.1/18.1 N-m) |
| Mandrel bend (in) | Pass 1/8" (0.318 cm) | Pass 1/8" (0.318 cm) | Pass 1/8" (0.318 cm) |
| Persoz hardness | 196 | 191 | 190 |
| MEK & toluene immersion (24 h) | Pass | Pass | Pass |

FIG. 16

Composition of PCA1/PCB1 DTM Coatings Tested

| Raw material | Weight | Gallons | Weight | Gallons | Weight | Gallons |
|---|---|---|---|---|---|---|
| Part A | PCA1&PCB1 DTM | | PCA1 DTM | | PCB1 DTM | |
| PCA1 | 174 | 18.84 (71.32 L) | 348 | 37.69 (142.7 L) | 0 | 0 (0 L) |
| PCB1 | 174 | 18.84 (71.32 L) | 0 | 0 (0 L) | 348 | 37.69 (142.7 L) |
| TiO₂ | 287 | 9.46 (35.8 L) | 287 | 9.46 (35.8 L) | 287 | 9.46 (35.8 L) |
| Zinc phosphate | 60 | 2.35 (8.90 L) | 60 | 2.35 (8.90 L) | 60 | 2.35 (8.90 L) |
| MAK | 153 | 22.50 (85.2 L) | 153 | 22.50 (85.2 L) | 153 | 22.60 (85.6 L) |
| Total Part A | 848 | 72.0 (273 L) | 848 | 72 (273 L) | 848 | 72.0 (273 L) |
| Part B | | | | | | |
| HDI trimer | 271 | 28 (106 L) | 271 | 28 (106 L) | 271 | 28 (106 L) |
| Total Part B | 271 | 28 (106 L) | 271 | 28 (106 L) | 271 | 28 (106 L) |
| Total Part A + Part B | 1119 | 100 (379 L) | 1119 | 100 (379 L) | 1119 | 100 (379 L) |
| PVC % | 17 | | 17 | | 17 | |
| Volume solids % | 77.5 | | 77.5 | | 77.5 | |
| Weight solids % | 86.5 | | 86.5 | | 86.5 | |
| VOC (g/L) | 183 | | 183 | | 183 | |

FIG. 17

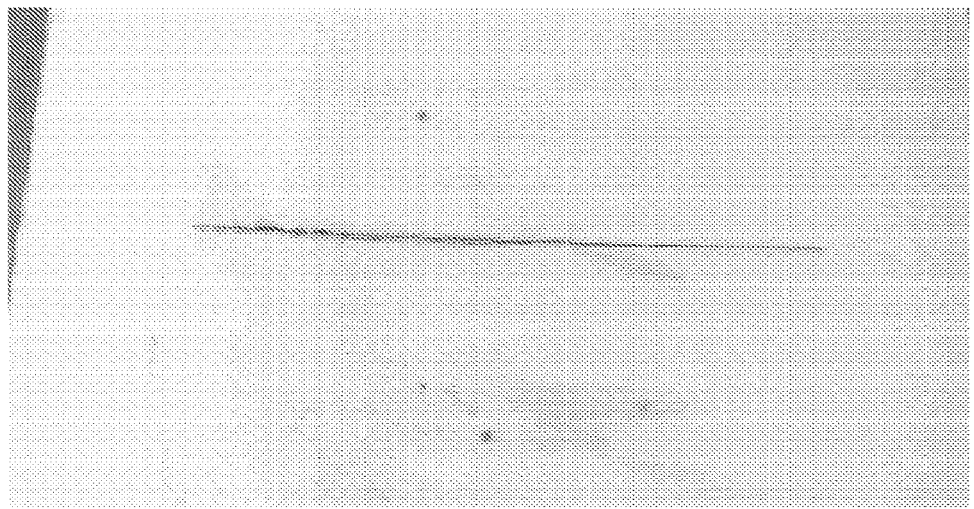
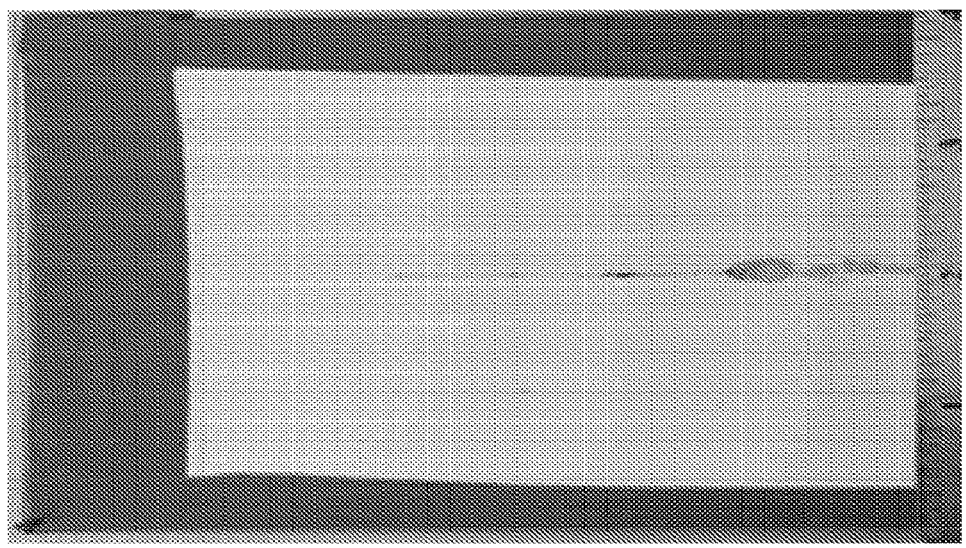
FIG. 19

Properties of PCA1/PCB1 Top Coat vs. Acrylic Urethane Top Coat

| Property | PCA1 Topcoat | PCB1 Top coat | AUT Top Coat |
|---|---|---|---|
| VOC at application (g/L) | 200 | 200 | 385 |
| Admixed viscosity (Zahn #2, s) | 28 | 28 | > 60 |
| Dry times (STT, TF, DH, TC) (h) STT= Set to touch, TF=Tack free, DH= Dry Hard TC= Through cure. | 0.5, 4.0, 5.0, 7 | 0.3, 0.5, 0.8, 1 | 0.75, 2,2,3, >14 |
| Gloss (60°) | 86 | 84 | 90 |
| QUV B, 1000 hrs, 60° gloss Ret./ ΔE | 84 / 0.4 | 82 / 0.4 | 96 / 0.4 |
| Tape adhesion (dry, wet) | 5A, 5A | 5A, 5A | 5A, 5A |
| Direct / reverse impact flex (in-lbs) | 160 / 140 (18.1/15.8 N-m) | 160 / 140 (18.1/15.8 N-m) | 80 / 0 (18.1/15.8 N-m) |
| Mandrel bend (in) | Pass 1/8 (0.318 cm) | Pass 1/8 inch (0.318 cm) | Pass 1/8 inch (0.318 cm) |
| Persoz hardness | 161 | 188 | 234 |
| MEK & toluene immersion (24 h) | Pass | Pass | Pass |

FIG. 20

Composition of Acrylic Polyol Top Coat

| Raw Material | Weight | Gallons |
|---|---|---|
| Part A | | |
| Acrylic polyol | 455.8 | 53.8 (204 L) |
| TiO₂ | 138.7 | 19.1 (72.3 L) |
| | 232.3 | 7.0 (87.9 L) |
| | 0.8 | 0.1 (0.4 L) |
| Total | 827.6 | 80.16 (303 L) |
| Part B | | |
| HDI trimer | 88.5 | 9.1 (34 L) |
| | 19.5 | 10.9 (41.3 L) |
| Total | 168 | 20 (76 L) |
| Part A + Part B | 995.6 | 100 (379 L) |

FIG. 21

PCA1/PCB1 Top Coat Formulations

| Raw Material | Weight | Gallons | Weight | Gallons |
|---|---|---|---|---|
| Part A | PCA1 top coat | | PCB1 Top coat | |
| PCA1 | 348 | 37.69 (142.7 L) | 0 | 0 (0 L) |
| PCB1 | 0 | 0 (0 L) | 348 | 37.69 (142.7 L) |
| $TiO_2$ | 347.8 | 11.45 (43.34 L) | 347.8 | 11.45 (43.34 L) |
| MAK | 153 | 22.86 (86.53 L) | 153 | 22.86 (86.53 L) |
| Total Part A | 848.6 | 72 (273 L) | 848.6 | 72 (273 L) |
| Part B | | | Part B | |
| HDI trimer | 271 | 28 (106 L) | 271 | 28 (106 L) |
| Total Part B | 271 | 28 (106 L) | 271 | 100 (379 L) |
| Part A + Part B | 1120 | 100 (379 L) | 1120 | 100 (379 L) |
| Physical properties | | | | |
| PVC % | 17 | | 17 | |
| Volume solids % | 77.5 | | 77.5 | |
| Weight solids % | 86.5 | | 86.5 | |
| VOC (g/L) | 183 | | 183 | |

FIG. 22

Index of Standardized Testing Methods

| Property | ASTM test Procedure |
|---|---|
| Adhesion, dry and wet tape | D3359 |
| Dry time | D5895 |
| Flexibility (mandrel bend) | D522 |
| Gloss | D523 |
| Hardness (Persoz) | D4366 |
| Impact resistance | D2794 |
| Corrosion resistance | B117 |
| Accelerated weathering (QUV B) | D4587 |
| Chemical resistance spot test | D1308 |

FIG. 23

POLYCARBAMIDE RESINS FOR METAL COATING APPLICATIONS

This Application is a § 371 national stage of PCT International Application No. PCT/IB2017/000225, filed Feb. 13, 2017, the contents of which are hereby incorporated by reference in their entirety into this application.

FIELD OF THE INVENTION

The subject matter of the instant invention relates to polycarbamide resin coating compositions, curing agents used to produce the coating compositions, and direct to metal coatings.

BACKGROUND

Metals and their alloys, such as steel, are excellent structural materials because of their high strength and outstanding mechanical properties. As such, they have been used for structural applications for centuries. However, when metals are exposed to a corrosive environment, the surface will oxidize and thus pose a potential danger to the whole steel structure and reduce its service life. The potential economic impact of the corrosion of metallic structures in the US is estimated to be a staggering $276 billion per year as estimated by National Associated of Corrosion Engineers (NACE).

The coatings industry has developed a wide variety of compositions which can be applied to the surface of various metal structures to prevent corrosion and extend service life. The compositions are formulated to produce coatings having desired physical characteristics for a particular use. In some applications, for example, impact resistance, may be the most significant property for a coating, while in coatings for bendable metal structures, flexibility will be an important consideration. The compositions required to produce coatings that maximize these physical properties differ.

Environmental conditions such as sun exposure, salt exposure, temperature variations and atmospheric pollution also influence the selection of a coating. The International Organization for Standardization (ISO) created atmospheric corrosivity categories based on risk for corrosion to help facility owners look for the right protection for their structures. The ISO has classed the risk from C1 (very low) to C5 (very high). C3 environmental conditions are defined as industrial and urban atmospheres with moderate sulfur dioxide contamination levels, or on shore areas of low salinity (ISO 12944).

Today, the corrosion protection of metal surfaces in C3 moderate corrosive environments is often obtained by multi-layer systems involving at least a primer and a top coat. These two coats are often based on different technologies, implying that compositions with several solvent-borne and water-borne components will be required. This introduces complexity, expense and inefficiency in the application of coatings and drying of equipment.

Alternatively, Direct-to-Metal coatings (DTM) provide both decorative as well as protective properties to the metal to which it is applied and are simpler to use because they can be applied in one coating. DTM coating technology is gaining market acceptance, as both shop-applied and field-applied systems, due to its ease of application, reduced down time, and increased productivity characteristics.

Common DTM coating systems include two-part polyurethane (2K PUR) DTM coatings which are formulated using aliphatic polyisocyanates and polyester or acrylic polyols. These polyurethane DTM coatings are favored because they provide acceptable weathering performance in outdoor applications. However, both polyester and polyacrylic polyol tend to be viscous and therefore require a solvent, which contributes high levels of volatile organic compounds (VOCs) to the coating formulations and often results in slower cure, poor flexibility and compromised corrosion protection. All of these factors limit the use of polyurethane technology in the DTM coatings market.

There is an unmet need for coatings, preferably DTM coatings, which provide good corrosion protection of metal surfaces in C3 moderate corrosive environments, and which provide physical characteristics as good or better than polyurethane-based DTM coatings, but without the associated VOC emissions.

SUMMARY

In some aspects, the instant invention solves problems associated with conventional coatings by providing coatings comprising polycarbamide resins. These coating compositions comprise two components: a polyisocyanate resin component, and a curing agent. The two components are stored separately and mixed immediately prior to use. The inventive polycarbamide resins, and coatings comprising such resins, have favorable physical characteristics compared to polyurethane-based coatings. They are suitable for DTM applications and are low VOC. By "low VOC" it is meant less than 225 g/l, as defined by current United States Environmental Protection Agency (USEPA) regulations.

In some aspects, the present invention is directed toward curing agents used in the production of the polycarbamide resin coating composition. In some embodiments, the curing agent comprises: (a) a secondary diamine "A", which comprises the reaction product of bis(4-aminocyclohexyl) methane and ethyl ester of 2-butenedioic acid; (b) a secondary diamine "B", which comprises the reaction product of bis(4-amino-3-methylcyclohexyl)methane and ethyl ester of 2-butendioic acid, and (c) at least one polyol. In an aspect of the invention, the components (a), (b) and (c) are present in approximately equal amounts by weight. In another aspect of the invention, component (a) comprises about 66% by weight of the curing agent and components (b) and (c) are present in equal amounts by weight.

A further aspect of this invention relates to non-aqueous coating compositions comprising the curing agent described above and a polyisocyanate resin component. In some aspects, the polyisocyanate resin comprises a hexamethylene isocyanate trimer. The non-aqueous coating compositions of aspects may optionally include solvents, pigments, defoamers and other additives known in the art.

The present invention also relates to, among other things, methods for using such coating compositions and curing agents to coat metal substrates and substrates at least partially coated with a cured coating formed by such coating compositions.

The various aspects of the invention can be used alone or in combination with each other.

BRIEF DESCRIPTION OF FIGURES

FIG. 1 shows the formulation of a first exemplary embodiment of a curing agent of the claimed invention.

FIG. 2 shows the formulation of a second exemplary embodiment of a curing agent of the claimed invention.

FIG. 3 shows the formulation of a first clear coat composition prepared using the curing agent of FIG. 1.

FIG. 4 shows the formulation of a second clear coat composition prepared using the curing agent of FIG. 2.

The results of physical testing on the cured clear coat compositions of FIGS. 3 and 4 are tabulated in FIG. 5.

FIG. 6 shows the formulation of a pigmented top coat composition prepared using the curing agent of FIG. 1.

FIG. 7 shows the formulation of a pigmented top coat composition prepared using the curing agent of FIG. 2.

The results of physical testing on the cured pigmented top coat compositions of FIGS. 6 and 7 are tabulated in FIG. 8.

FIG. 9 shows the formulation of a pigmented direct to metal composition prepared using the curing agent of FIG. 1.

FIG. 10 shows the formulation of a pigmented direct to metal composition prepared using the curing agent of FIG. 2.

The results of physical testing on the cured pigmented direct to metal compositions of FIGS. 9 and 10 are tabulated in FIG. 11.

Certain physical properties of the curing agents of FIGS. 1 and 2 are tabulated in FIG. 12.

Physical properties of a typical aliphatic polyisocyanate resin are shown in FIG. 13.

The gel times for exemplary clear coat compositions are listed in FIG. 14.

Figure 15:
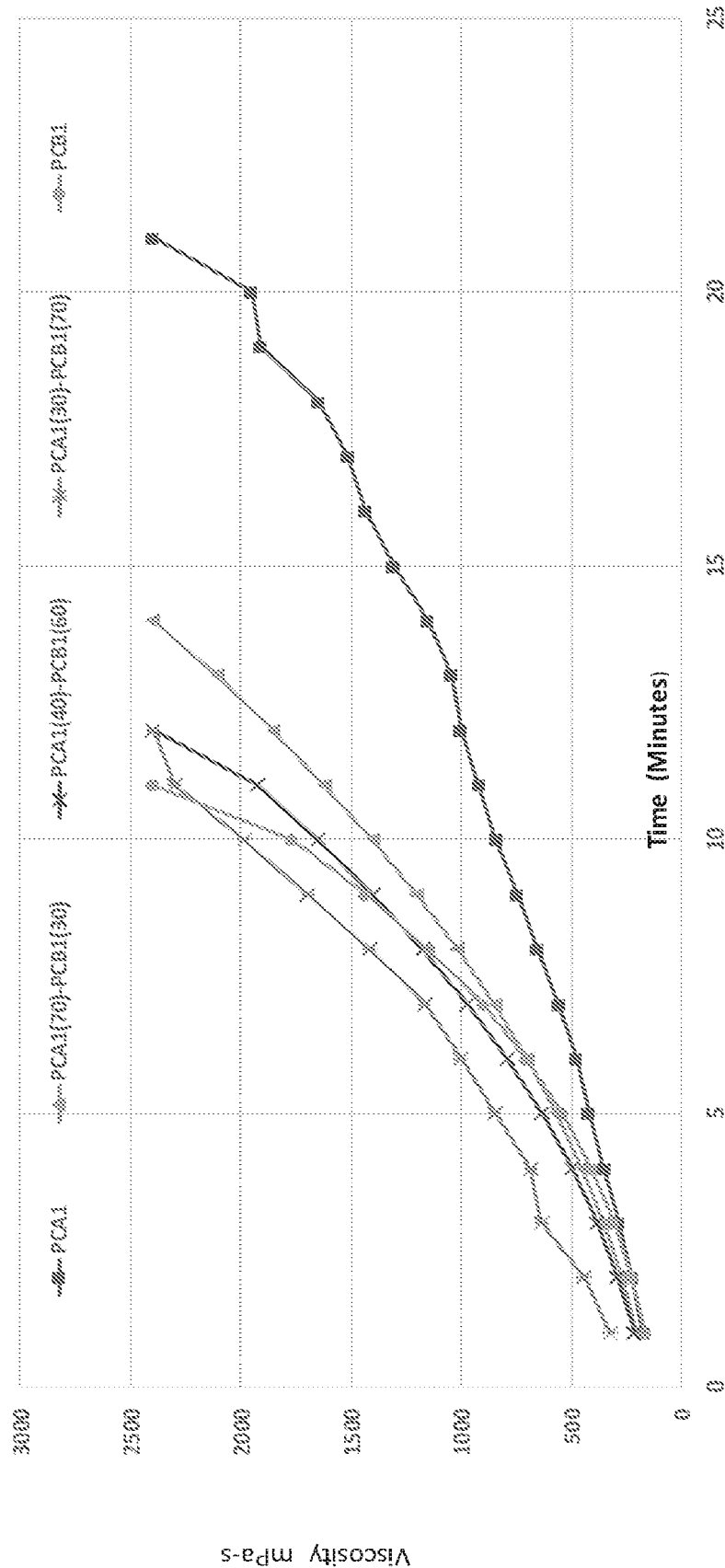

Pot life for exemplary coatings of the present invention are shown FIG. 15.

Performance properties of direct to metal coatings of the present invention and those of polyurethane direct to metal coatings are compared in FIG. 16.

The formulations of coatings for corrosion testing are shown in FIG. 17.

Figure 18:
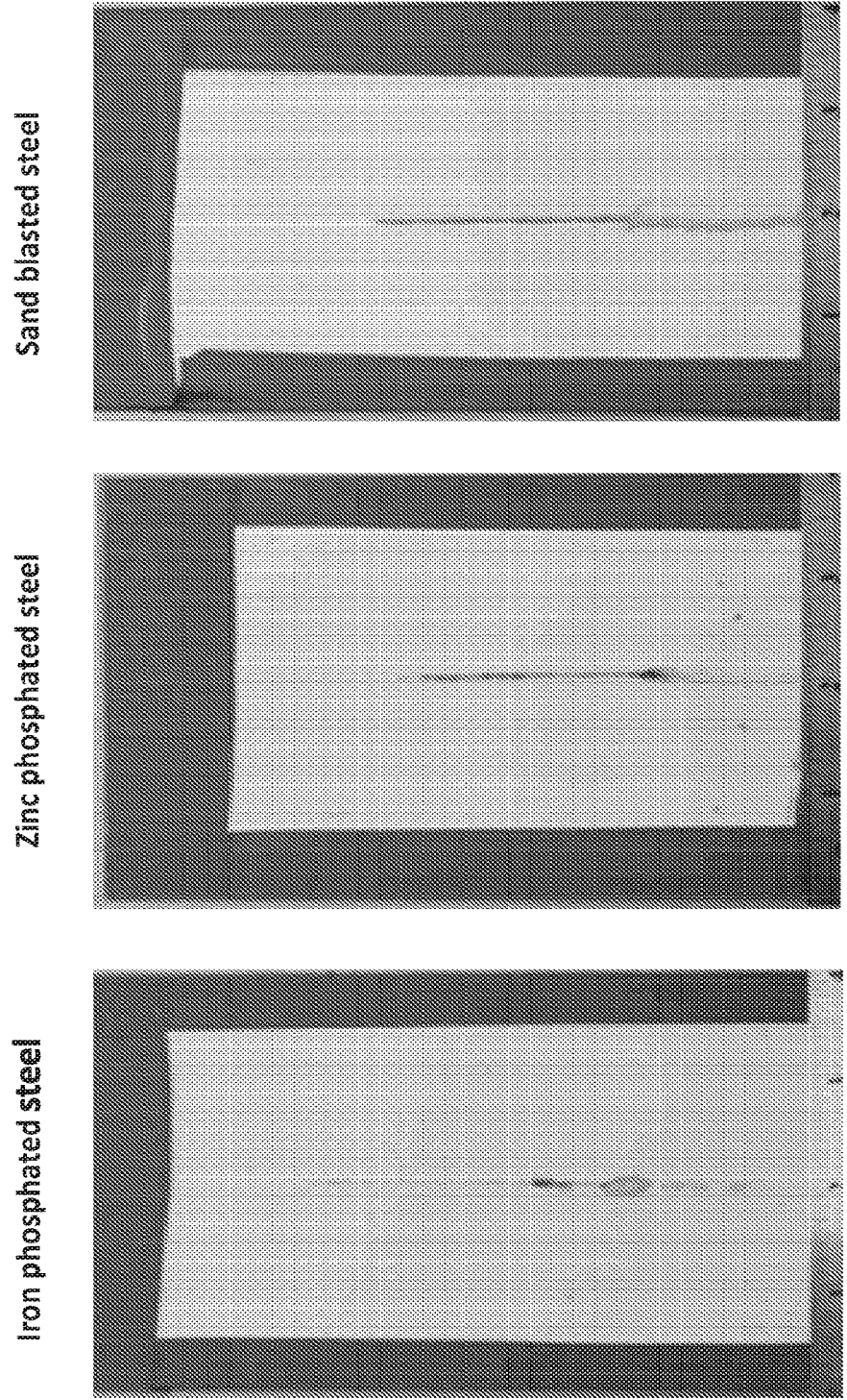

FIG. 18 shows photographs of test panels having direct to metal coatings of the present invention after corrosion testing in accordance with ASTM B-117.

FIG. 19 shows photographs of test panels coated with coatings of the present invention and polyurethane direct to metal coatings after corrosion testing in accordance with ASTM B-117.

Performance properties of coatings of the present invention and those of acrylic urethane top coats are compared in FIG. 20.

FIG. 21 shows the formulation of a pigmented acrylic polyol top coat composition.

FIG. 22 shows the formulation of top coat compositions of the present invention.

FIG. 23 is an index of standardized testing methods used to evaluate the present invention.

DETAILED DESCRIPTION

In certain aspects, the instant invention relates to two-component polycarbamide resin coating compositions comprising a curing agent component and an isocyanate resin component. The curing agent comprises a mixture of (a) secondary diamine A, which comprises the reaction product of bis(4-aminocyclohexyl) methane and ethyl ester of 2-butenedioic acid; (b) secondary diamine B, which comprises the reaction product of bis(4-amino-3-methylcyclohexyl)methane and ethyl ester of 2-butenedioic acid; and (c) at least one polyol. As used herein, secondary diamine A is sometimes referred to as the first secondary diamine, and secondary diamine B is sometimes referred to as the second secondary diamine.

Optionally, the coatings may contain additional ingredients, such as viscosity reducers, solvents, pigments, and defoamers. Such coating compositions, when cured, result in finished surfaces with favorable resistance to impact, chemical resistance, weathering, resistance against UV radiation, and adhesion to a variety of substrates. These coatings can be advantageously used to protect the surface on which it is applied.

As used herein, the term "coating composition" refers to a mixture of chemical components that will cure and form a hardened coating when applied to a substrate. As used herein, the term "polyisocyanate resin" refers to the component of the coating composition which comprises a polyisocyanate. As used herein, the term polyisocyanate refers to compounds comprising at least two unreacted isocyanate groups, sometimes abbreviated as NCO.

As used herein, the term "curing agent" refers to the component of a two component coating composition which reacts with the isocyanate groups of a polyisocyanate resin component. As used herein, the term "curing" means to bring about the toughening or hardening of a polymer material by cross-linking of polymer chains. As used herein, a cross-link is any bond that links one polymer chain to another. They can be covalent bonds or ionic bonds. The isocyanate-reactive groups of the curing agent are also referred to herein as active hydrogen or abbreviated OH/NH.

As used herein, the term "pot life" is the time period in which a coating composition is sufficiently liquid such that it may be applied to a substrate material to be coated.

Various embodiments are described and illustrated in this specification to provide an overall understanding of the structure, function, operation, manufacture, and use of the disclosed products and processes.

It is understood that the various embodiments described and illustrated in this specification are non-limiting and non-exhaustive. Thus, the invention is not limited by the description of the various non-limiting and non-exhaustive embodiments disclosed in this specification. Rather, the invention is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. The various embodiments disclosed and described in this specification can comprise, consist of, or consist essentially of the features and characteristics as variously described herein.

Any patent, publication, or other disclosure material identified herein is incorporated herein by reference in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other dis-closure material set forth herein, is only incorporated to the extent that no conflict arises between that incorporated mate-rail and the existing disclosure material. Applicant reserves the right to amend this specification to expressly recite any subject matter, or portion thereof, incorporated by reference herein.

Reference throughout this specification to "certain embodiments", "some embodiments", "various non-limiting embodiments," or the like, means that a particular feature or characteristic may be included in an embodiment. Thus, use of such phrases, and similar phrases, in this specification does not necessarily refer to a common embodiment, and may refer to different embodiments. Further, the particular features or characteristics may be combined in any suitable manner in one or more embodiments. Thus, the particular features or characteristics illustrated or described in connection with various embodiments may be combined, in whole or in part, embodiments described in this specification are non-limiting and non-exhaustive.

In this specification, other than where with the features or characteristics of one or more other embodiments without limitation. Such modifications and variations are intended to be included within the scope of the present specification. In this manner, the various otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary round-in techniques.

Also, any numerical range recited in this specification is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

The grammatical articles "a", "an", and "the", as used herein, are intended to include "at least one" or "one or more", unless otherwise indicated, even if "at least one" or "one or more" is used in certain instances. Thus, the articles are used in this specification to refer to one or more than one (i.e., to "at least one") of the grammatical objects of the article. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Polycarbamide resins and coatings containing polycarbamide resins according to embodiments of the present invention are prepared by curing an isocyanate resin with a curing agent comprising two secondary diamines and at least one polyol. In certain embodiments, the coatings comprise two-component coatings. As used herein, the term two-component coating refers to a composition comprising two components that are stored in separate containers prior to use because of their mutual reactivity. Two-component coating compositions are also referred to herein as 2K coatings.

A first component of the coating is the curing agent and the second component is the isocyanate resin. The two components are generally not mixed until shortly before application of the composition to a substrate. When the two separate components are mixed and applied as a film on the substrate, the mutually reactive compounds in the two components react to crosslink and cure the coating film.

Polycarbamide Coating Compositions

In some aspects, the coating compositions of the present invention comprise a polyisocyanate component and a curing agent component. The curing agent component comprises a polyol and secondary diamines which are the reaction products of cycloalkyl diamines and ethyl esters of dicarboxylic acids. The isocyanate resin component comprises a polyisocyanate compound having at least two unreacted isocyanate functional groups. The coating composition may also contain solvents, pigments, defoamers and other additives known in the art.

When the two components of the two-component coating composition are combined, the active hydrogens of the amine (NH) and hydroxyl (OH) functional groups of the curing agent component react with the isocyanate (NCO) functional groups of the polyisocyanate component to crosslink the polymers in the composition, causing the composition to cure, or harden. In certain embodiments of the coating compositions of the present invention, the active hydrogens (OH/NH) of the curing agent component are present in amounts sufficient to provide an equivalent ratio to the isocyanate (NCO) functional groups of the polyisocyanate component. Preferably, the ratio of isocyanate (NCO) to isocyanate-reactive groups (OH/NH) ranges from 0.8:1 to 20:1. More preferably, the ratio ranges from 0.8:1 to 2:1, or, most preferably, from 0.8:1 to 1.2:1.

The Curing Agent Component

The curing agent in certain embodiments of the present invention comprises a mixture of (a) a first secondary amine A, comprising the reaction product of bis (4-aminocyclohexyl) methane and ethyl ester of 2-butenedioic acid; (b) a second secondary amine B, comprising the reaction product of bis (4-amino-3-methylcyclohexyl) methane and ethyl ester of 2-butenedioic acid; and (c) at least one polyol.

In a preferred embodiment, equal weights of secondary diamine A, secondary diamine B and the polyol are combined to create the curing agent composition. In another preferred embodiment, secondary diamine A comprises from 50% to 80% of the weight of the composition, while secondary diamine B and the at least one polyol make up nearly equal parts of the remaining weight of the composition. The weight percentage of the at least one polyol is the weight percentage of all polyols, if more than one polyol is present in the curing agent. As used in this context, equal means within 5% by weight. In another embodiment, secondary diamine A comprises from 60% to 70% of the weight of the composition, while secondary diamine B and the polyol make up equal parts of the remaining weight of the composition.

The composition of the curing agent component affects the curing speed that results when the curing agent is used to cure an isocyanate resin in a two-component coating composition. Generally, increasing the quantity of secondary amine B results in a curing agent which will yield a slower cure. As illustrated by the Examples which follow, embodiments of the present invention can provide coatings with slower curing speeds suitable for applications where a long pot life is desirable, as well as faster-curing compositions suitable for applications where the part to be coated must return to service quickly.

In an aspect of the invention, the curing agent composition is prepared by slowly mixing secondary diamine B into secondary diamine A while stirring the mixture. Stirring continues for a period ranging from 5 to 20 minutes and then the polyol is added.

The Secondary Diamines A and B

The reaction yielding secondary diamine A is represented in equation 1.

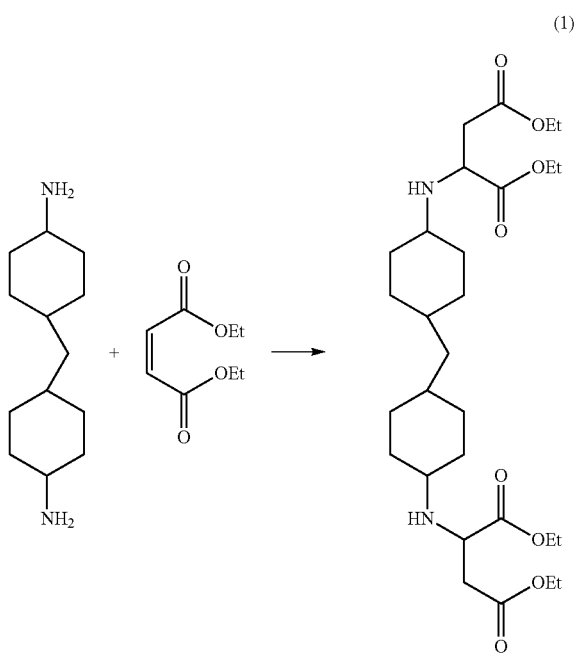 [SMILES: NC1CCC(CC2CCC(N)CC2)CC1 ; CCOC(=O)/C=C\C(=O)OCC ; CCOC(=O)CC(NC1CCC(CC2CCC(NC(CC(=O)OCC)C(=O)OCC)CC2)CC1)C(=O)OCC]

(1)

The reaction yielding secondary diamine B is represented in equation (2).

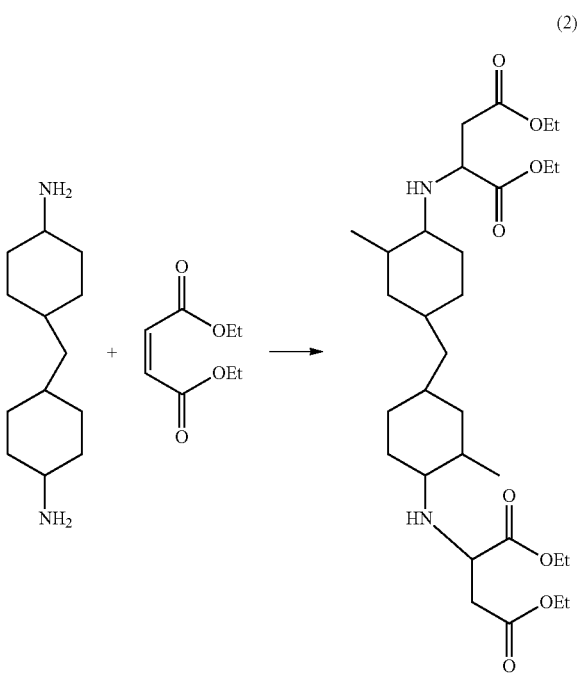 [SMILES: NC1CCC(CC2CCC(N)CC2)CC1 ; CCOC(=O)/C=C\C(=O)OCC ; CCOC(=O)CC(NC1CCC(CC2CCC(NC(CC(=O)OCC)C(=O)OCC)C(C)C2)CC1C)C(=O)OCC]

(2)

The production of the secondary diamines from the above-mentioned polyamine and butenedioic acid ester starting materials may take place within a temperature range of, for example, 0° C. to 100° C. The starting materials may be used in amounts such that there is at least one equivalent, and in some embodiments approximately one equivalent, of olefinic double bonds in the maleic/fumaric acid esters for each equivalent of primary amino groups in the polyamine. Any starting materials used in excess may be separated off by distillation following the reaction. The reaction may take place in the presence or absence of suitable solvents, such as methanol, ethanol, propanol, dioxane, or combinations thereof.

The Polyol

The polyol component comprises polymeric polyols suitable for use in the compositions of the present invention include polyester polyols and poly-ether polyols, however, in certain embodiments of the coating compositions of the present invention the polyol component comprises a polyester polyol. Preferably, the polyol component comprises polyester diols with hydroxyl values of 200-265 and hydroxyl group percent of 0.1 to 12%. The most preferred polyols include those synthesized using succinic acid, glutaric acid, and adipic acid. The most preferred polyols also include 2-methyl-1, 3 propanediol and 1, 4-cyclohexanedimethanol. Mixtures of the various polymeric polyols may be used.

The Polyisocyanate Component

Another component of the two-component coating composition the polyisocyanate component, which comprises an isocyanate functional compound having the general formula (3):

$$R(NCO)_i, \qquad (3)$$

wherein R is an organic radical having the valence of i, wherein i is greater than or equal to about 2. R can be a substituted or unsubstituted hydrocarbon group (e.g., a methylene group or an arylene group). This component is referred to herein as the isocyanate component or the polyisocyanate component.

The isocyanates can be aromatic or aliphatic. Useful aromatic diisocyanates can comprise, for example, 2,4-toluene diisocyanate and 2,6-toluene diisocyanate (each generally referred to as TDI); mixtures of the two TDI isomers; 4,4'-diisocyanatodiphenylmethane (MDI); p-phenylene diisocyanate (PPDI); diphenyl-4,4'-diisocyanate; dibenzyl-4,4'-diisocyanate; stilbene-4,4'-diisocyanate; benzophenone-4,4'-diisocyanate; 1,3- and 1,4-xylene diisocyanates; or the like, or a combination comprising at least one of the foregoing aromatic isocyanates.

Useful aliphatic diisocyanates can comprise, for example, 1,6-hexamethylene diisocyanate (HDI); 1,3-cyclohexyl diisocyanate; 1,4-cyclohexyl diisocyanate (CHDI); the saturated diphenylmethane diisocyanate known as H(12)MDI; (also known commercially as bis{4-isocyanatocyclohexyl}methane, 4,4'-methylene dicyclohexyl diisocyanate, 4,4-methylene bis(dicyclohexyl)diisocyanate, methylene dicyclohexyl diisocyanate, methylene bis(4-cyclohexylene isocyanate), saturated methylene diphenyl diisocyanate, and saturated methyl diphenyl diisocyanate), isophorone diisocyanate (IPDI); or the like; or a combination comprising at least one of the foregoing isocyanates. An exemplary aliphatic diisocyanate is H(12)MDI.

Other exemplary polyisocyanates include hexamethylene diisocyanate (HDI), 2,2,4- and/or 2,4,4-trimethyl-1,6-hexamethylene diisocyanate, dodecamethylene diisocyanate, 1,4-diisocyanatocyclohexane, 1-isocyanato-3,3,5-trimethyl-5-isocyanatomethylcyclohexane (IPDI), 2,4'- and/or 4,4'-diisocyanato-dicyclohexyl methane, 2,4- and/or 4,4'-diisocyanato-diphenyl methane and mixtures of these isomers with their higher homologues which are obtained by the phosgenation of aniline/formaldehyde condensates, 2,4- and/or 2,6-diisocyanatotoluene and any mixtures of these compounds. Higher functional hexamethylenediisocyanate (HDI) polyisocyanates such as biurets, trimers, and dimers, were found to be particularly useful for purposes of the present invention. The amount of polyisocyanate used will preferably provide a mole ratio of NCO to NH ranging from about 0.5 to about 2.0.

Optional Coating Additives

The coating compositions of the present invention may comprise any of a variety of conventional auxiliary agents or additives, such as, but not limited to, defoamers, solvent, rheology modifiers (e.g., thickeners), leveling agents, flow promoters, colorants, fillers, UV stabilizers, dispersing agents, catalysts, anti-skinning agents, anti-sedimentation agents, emulsifiers, and/or organic solvents. In a two-component coating composition, the coating additives are preferably added to the curing agent component.

The coating composition can also comprise at least one viscosity modifier. A viscosity modifier can comprise at least one of polar or nonpolar solvents or non-reacting diluents. Examples of solvents comprise at least one member selected from the group consisting of hexane, heptane, xylene, toluene, cyclohexane; ester type one such as methyl acetate, ethyl acetate, t-butyl acetate, acetic acid ethylene glycol monomethyl ether, acetic acid diethylene glycol monomethyl ether, dibasic ester; ether type one such as isopropyl ether, ethylene glycol monomethyl ether, diethylene glycol monobutyl ether; ketone type such as methyl amyl ketone, methyl isobutyl ketone, methyl ethyl ketone, isophorone, acetophenone; carbonate type such as propylene carbonate, dimethyl carbonate; Pyrollidone type such as n-methyl pyrollidone, n-ethyl pyrollidone; halogenated solvent type such as parachlorobenzotrifluoride, 1,1,2,2-tetrachloroethane, 1,1-dichloroethane and any other protic or aprotic solvent that are inert towards amines or polyisocyanates. Examples of non-reacting diluents comprise at least one member selected from the group consisting of phthalate type such as bis(2-ethylhexyl) phthalate, diisononyl phthalate, butyl benzyl phthalate; ester type such as dioctyl adipate, dibutyl sebacate, 1,2-cyclohexane dicarboxylic acid diisononyl ester, 2,2,4-trimethyl-1,3-pentanediol diisobutyrate, alkyl sulphonic acid phenyl ester; citrate types such as acetyl triethyl citrate, triethyl citrate; trimellitate type such as trimethyl trimellitate, tri-(2-ethylhexyl) trimellitate and other class of non-reacting diluents such as benzoates, sulfonamides, epoxidized vegetable oils, organophosphates, glycols, polyethers, polybutene and combinations thereof. The amount of viscosity modifier typically ranges from about 1 to about 24. High activity and low density solvents are preferred. The term high activity solvent refers to ability of the solvent to reduce viscosity of the resins. The preferred solvent comprises methyl-n-amyl ketone (MAK). The amount of viscosity modifier typically ranges from about 1 to about 24 percent based on the formulation weight.

EXAMPLES

The following Examples are provided to illustrate certain aspects of the invention and shall not limit the scope of the claims appended hereto.

Example 1

PCA1 Curing Agent

PCA1 curing agent of Example 1 is made by blending (a) secondary diamine A (b) secondary diamine B and (c) polyol in the weight percentages shown in FIG. 1. The secondary diamine A was added to the reaction vessel and stirred for 15 minutes using an air-driven motor attached with a mixer blade at room temperature. The secondary diamine B was then added slowly in 10 minutes and mixed for another 10 minutes. The polyol was added last in 10 minutes and mixed further for 15 minutes.

Example 2

PCB1 curing agent of Example 2 is made by blending (a) secondary diamine A (b) secondary diamine B and (c) polyol in the weight percentages shown in FIG. 2. The procedure was the same as in Example 1.

Example 3

Clear Coat Formulation Made with PCA1

Clear coat compositions were prepared using the ingredients and amounts (parts by weight) listed in FIG. 3. The coating compositions were prepared using a traditional high speed disperser. The disperser was charged with PCA1 curing agent and methyl n-amyl ketone (MAK) solvent was added slowly over about 20 minutes. The compositions were allowed to rest for 24 hours. After resting, hexamethylene diisocyanate (HDiT) trimer was added in sufficient quantity to produce a coating composition having an isocyantate to active hydrogen ratio of 1.05 NCO to 1.0 OH/NH. The composition was mixed and testing commenced. The clear coat formulation of Example 3 was applied onto Bonderite 952 steel panels and allowed to cure.

Example 4

Clear Coat Formulation Made with PCB1

Clear coat compositions were prepared using the ingredients and amounts (parts by weight) listed in FIG. 4. The coating compositions were prepared using a traditional high speed disperser. The disperser was charged with PCB1 curing agent and MAK solvent was added slowly over about 20 minutes. The compositions were allowed to rest for 24 hours. After resting, HDiT trimer was added to the composition in sufficient quantity to provide an isocyantate to active hydrogen ratio of 1.05 NCO to 1.0 OH/NH. The coating composition was mixed and testing commenced. The clear coat formulation of Example 4 was applied onto Bonderite 952 steel panels and allowed to cure.

Example 5

Physical Testing Results for Clear Coat Formulations

The cured clear coat formulations were tested for physical properties using ASTM procedures known in the art. An ASTM designation number identifies a unique version of an ASTM standard. For example, in the designation for Impact Resistance-D2794-93(2010), D designates "miscellaneous materials;" 2794 represents an assigned sequential number; 93 is the last two digits of the year of original adoption (or, in the case of revision, the year of last revision); and (2010) is the year of the last re-approval. An index of the testing procedures discussed throughout the Examples and their ASTM designations is provided in FIG. 23. The results of the clear coat formulation testing are tabulated in FIG. 5.

Example 6

Pigmented Top Coat Formulation Made with PCA1

Pigmented top coat compositions were prepared using the ingredients and amounts (parts by weight) listed in FIG. 6.

The coating compositions were prepared using a traditional high speed disperser. The disperser was charged with PCA1 curing agent followed by addition of titanium dioxide pigment and dispersed for 30 minutes on a high speed. MAK solvent was added slowly over about 20 minutes. The compositions were allowed to rest for 24 hours. After resting, HDiT trimer was added and mixed to provide a coating composition having and isocyanate to active hydrogen ratio of 1.05 NCO to 1.0 OH/NH. The composition was mixed and testing commenced. The pigmented top coat of Example 6 was applied to Bonderite 952 steel panels and allowed to cure.

Example 7

Pigmented Top Coat Formulation made with PCB1

Pigmented top coat compositions were prepared using the ingredients and amounts (parts by weight) listed in FIG. 7. The coating compositions were prepared using a traditional high speed disperser. The disperser was charged with PCB1 curing agent followed by addition of titanium dioxide pigment and dispersed for 30 minutes on a high speed. MAK solvent was added slowly over about 20 minutes. The compositions were allowed to rest for 24 hours. After resting, HDiT trimer was added and mixed to provide a coating composition having an isocyanate to active hydrogen ratio of 1.05 NCO to 1.0 OH/NH. The composition was mixed and testing commenced. The pigmented top coat of Example 7 was applied onto Bonderite 952 steel panels and allowed to cure.

Example 8

Physical Testing Results for Pigmented Top Coat Formulations

The cured pigmented top coat formulations were tested for physical properties using ASTM procedures known in the art. The results are tabulated in FIG. 8.

Example 9

Direct to Metal Formulation Made with PCA1

Pigmented direct to metal compositions were prepared using the ingredients and amounts (parts by weight) listed in FIG. 9. The coating compositions were prepared using a traditional high speed disperser. The disperser was charged with PCA1 curing agent and titanium dioxide was added slowly and dispersed for 30 minutes. Zinc polyphosphate pigment was then added and dispersed for another 20 minutes followed by addition of MAK solvent, added slowly over about 20 minutes.

The compositions were allowed to rest for 24 hours. After resting, HDiT trimer was added and mixed to provide a coating composition having an isocyanate to active hydrogen ratio of 1.05 NCO to 1.0 OH/NH. The composition was mixed and testing commenced. The direct-to metal formulation of example 2 were applied on to Bonderite 952 steel panels and allowed to cure.

Example 10

Direct to Metal Formulation Made with PCB1

Pigmented direct to metal compositions were prepared using the ingredients and amounts (parts by weight) listed in FIG. 10. The coating compositions were prepared using traditional high speed disperser. The disperser was charged with PCB1 curing agent and titanium dioxide was added slowly and dispersed for 30 minutes. Zinc polyphosphate pigment was then added and dispersed for another 20 minutes followed by addition of MAK solvent, added slowly over about 20 minutes.

The compositions were allowed to rest for 24 hours. After resting, HDiT trimer was added and mixed to provide a coating composition having an isocyanate to active hydrogen ratio of 1.05 NCO to 1.0 OH/NH. The composition was mixed and testing commenced. The direct-to metal formulation of Example 10 was applied onto Bonderite 952 steel panels and allowed to cure.

Example 11

Physical Testing Results for DTM Formulation

The DTM formulations were tested for physical properties using ASTM procedures known in the art. The results are tabulated in FIG. 11. The DTM coatings were also tested for corrosion protection using ASTM B 117 Standard Practice for Operating Salt Spray (Fog) Apparatus.

Example 12

Certain physical properties PCA1 and polycarbamide curing agents PCB1 are shown in FIG. 12.

Example 13

Typical physical properties of aliphatic polyisocyanate resin are shown in FIG. 13.

Example 14

Gel Times

The gel time for clear coats based on polycarbamide curing agents with HDI trimer and MAK solvent were measured and are listed in FIG. 14.

Example 15

Pot Life

Pot life of polycarbamide curing agents (PCA1 and PCB1): The period of time from the initial mixture of polycarbamide curing agent in different ratios with HDI trimer and MAK solvent to the point at which the mixtures exhibit a viscosity of 2000 mPA-s is given in FIG. 15. The pot life data clearly shows that the reactivity data of the polycarbamide curing agents can be altered by changing the structure of the base polycarbamide curing agents. The more hindered PCA1 curing agent has much longer pot life than PCB1 curing agent.

Example 16

Performance properties of PCA1 and PCB1 DTM coatings compared to 2K polyurethane DTM
Performance properties of PCA1 and PCB1 DTM coatings compared to 2K polyurethane DTM are listed in FIG. 16.

Example 17

PCA1 and PCB1 DTM Coating. The formulations of direct to metal coating compositions that were evaluated by corrosion testing are listed in FIG. 17.

Examples 18 and 19

Photographs of Corrosion Resistance Testing

FIG. 18 shows photographs of test panels having polycarbamide DTM coatings of the present invention. The coated panels were evaluated for 500 hours in accordance with ASTM B-117. FIG. 19 shows photographs of test panels coated with polycarbamide DTM and two-component polyurethane DTM coatings. The coated panels were evaluated for 500 hours in accordance with ASTM B-117.

Example 20

Performance Properties of Polycarbamide and Acrylic Urethane Top Coat

FIG. 20 shows the performance properties of PCA1 and PCB1 topcoat coatings compared to acrylic urethane top coats.

Example 21

Pigmented Acrylic Polyol Top Coat

FIG. 21 shows the formulation of a pigmented acrylic polyol top coat composition.

Example 22

Top Coat Formulations

FIG. 22 shows the compositions of top coat formulations made using PCA1 and PCB1.

The invention has been described with reference to certain aspects, but other aspects and embodiments are apparent to persons of skill in the art, and are included within the scope of the claims.

What is claimed is:

1. A curing agent composition, comprising:
   at least one polyol;
   a first secondary diamine consisting of the reaction product of bis(4-aminocyclohexyl) methane and ethyl ester of 2-butenedioic acid; and
   a second secondary diamine consisting of the reaction product of bis(4-amino-3-methylcyclohexyl) methane and ethyl ester of 2-butenedioic acid;
   wherein each of the at least one polyol is selected from the group consisting of: polyols synthesized using succinic acid, glutaric acid, and adipic acid; 2-methyl-1,3-propanediol; and 1,4-cyclohexanedimethanol.

2. The curing agent composition of claim 1, wherein the first secondary diamine comprises 20% to 50% by weight of the curing agent composition, wherein the second secondary diamine comprises 20% to 50% by weight of the curing agent composition, and wherein the at least one polyol comprises 20% to 50% by weight of the curing agent composition.

3. The curing agent composition of claim 1, wherein the first secondary diamine comprises 45% to 85% by weight of the curing agent composition, wherein the second secondary diamine comprises 5% to 30% of the curing agent composition, and wherein the at least one polyol comprises 5% to 30% by weight of the curing agent composition.

4. The curing agent composition of claim 1, wherein the first secondary diamine and the second secondary diamine are present in equal amounts by weight, and wherein the second secondary amine and the polyol are present in equal amounts by weight.

5. The curing agent composition of claim 1, wherein the first secondary diamine and the second secondary diamine are present at a weight ratio of at least 2:1, and wherein the second secondary amine and the polyol are present in equal amounts by weight.

6. The curing agent of claim 1, wherein the first secondary diamine being represented by the formula:

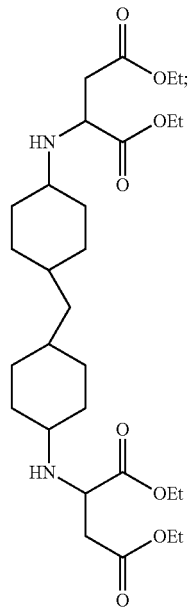 [SMILES: CCOC(=O)CC(NC1CCC(CC2CCC(NC(CC(=O)OCC)C(=O)OCC)CC2)CC1)C(=O)OCC]

and wherein the second secondary diamine being represented by the formula:

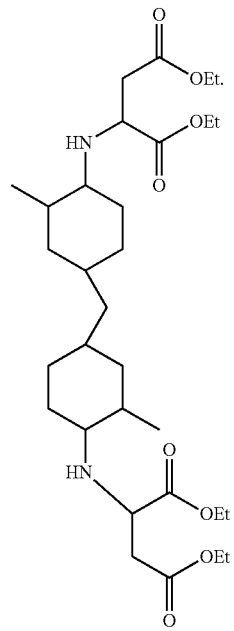 [SMILES: CCOC(=O)CC(NC1CCC(CC2CCC(NC(CC(=O)OCC)C(=O)OCC)C(C)C2)CC1C)C(=O)OCC]

7. A coating composition, comprising:
   a polyisocyanate;
   at least one polyol; wherein each of the at least one polyol is selected from the group consisting of: polyols synthesized using succinic acid, glutaric acid, and adipic acid; 2-methyl-1,3-propanediol; and 1,4-cyclohexanedimethanol;

a first secondary diamine, wherein the first secondary diamine consists of the reaction product of bis(4-aminocyclohexyl) methane and ethyl ester of 2-butenedioic acid; and a second secondary diamine, wherein the second secondary diamine consists of the reaction product of bis(4-amino-3-methylcyclohexyl) methane and ethyl ester of 2-butenedioic acid.

8. The coating composition of claim 7, further comprising at least one selected from the group consisting of solvents, pigments and defoamers.

9. The coating composition of claim 7, wherein the coating composition comprises a solvent comprising methyl n-amyl ketone.

10. The coating composition of claim 7, further comprising titanium dioxide.

11. The coating composition of claim 7, wherein the polyisocyanate comprises a compound represented by the general formula: $R(NCO)_i$, where R is an organic radical having a valence of i, where i is greater than or equal to 2, and where R is a substituted or unsubstituted hydrocarbon group.

12. The coating composition of claim 7, wherein the isocyanate comprises hexamethylene diisocyanate.

13. A method comprising:
(a) reacting bis(4-aminocyclohexyl) methane and ethyl ester of 2-butenedioic acid to create a first reaction product comprising a first secondary diamine;
(b) reacting bis(4-amino-3-methylcyclohexyl) methane and ethyl ester of 2-butenedioic acid, to create a second reaction product comprising a second secondary diamine; and
(c) mixing the first reaction product, the second reaction product and at least one polyol to produce a curing agent composition, wherein each of the at least one polyol is selected from the group consisting of: polyols synthesized using succinic acid, glutaric acid, and adipic acid; 2-methyl-1,3-propanediol; and 1,4-cyclohexanedimethanol.

14. The method of claim 13, wherein step (c) further comprises mixing the first reaction product, and the second reaction product, and at least one polyol in proportions that result in the first secondary diamine comprising 20% to 50% by weight of the curing agent composition, the second secondary diamine comprising 20% to 50% of the curing agent composition, and the at least one polyol comprising 20% to 50% by weight of the curing agent composition.

15. The method of claim 13, wherein step (c) further comprises mixing the first reaction product, and the second reaction product, and at least one polyol in proportions that result in the first secondary diamine comprising 45% to 85% by weight of the curing agent composition, the second secondary diamine comprising 5% to 30% of the curing agent composition, and the at least one polyol comprising 5% to 30% by weight of the curing agent composition.

16. The method of claim 13, wherein step (c) further comprises mixing the first reaction product, and the second reaction product, and at least one polyol in proportions that result in the first secondary diamine and the second secondary diamine being present in substantially equal amounts by weight in the curing agent composition, and the second secondary diamine and the at least one polyol being present in substantially equal amounts by weight in the curing agent composition.

17. The method of claim 13, wherein step (c) further comprises mixing the first reaction product, and the second reaction product, and at least one polyol in proportions that result in the first secondary diamine and the second secondary diamine being present at a weight ratio of at least 2:1 in the curing agent composition, and the second secondary diamine and the at least one polyol being present in substantially equal amounts by weight in the curing agent composition.

18. The method of claim 13, wherein step (a) further comprises reacting bis(4-aminocyclohexyl) methane and ethyl ester of 2-butenedioic acid to create a first reaction product comprising a first secondary diamine being represented by the formula:

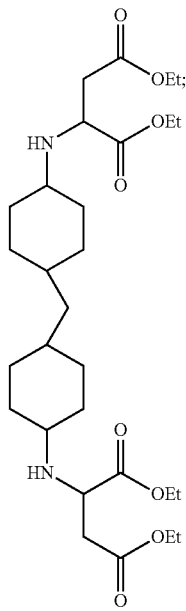 [SMILES: CCOC(=O)CC(NC1CCC(CC2CCC(NC(CC(=O)OCC)C(=O)OCC)CC2)CC1)C(=O)OCC]

and
wherein step (b) further comprises reacting bis(4-amino-3-methylcyclohexyl) methane and ethyl ester of 2-butenedioic acid, to create a second reaction product comprising a second secondary diamine being represented by the formula:

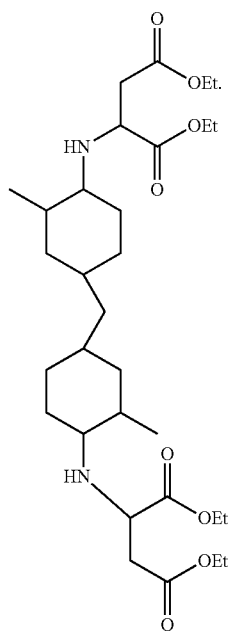 [SMILES: CCOC(=O)CC(NC1CCC(CC2CCC(NC(CC(=O)OCC)C(=O)OCC)C(C)C2)CC1C)C(=O)OCC]

19. The method of claim 13, further comprising:
(d) mixing a solvent with the curing agent, to produce a first intermediate composition;

(e) reacting the first intermediate composition with a polyisocyanate that, when cured, produces a coating composition.

20. The method of claim 19, wherein step (d) further comprises mixing a solvent consisting of methyl n-amyl ketone with the curing agent, to produce a first intermediate composition.

21. The method of claim 19, wherein step (e) further comprises reacting the first intermediate composition with a polyisocyanate that, when cured, produces a coating composition, wherein the polyisocyanate comprises a compound represented by the general formula: $R(NCO)_i$, where R is an organic radical having a valence of i, where i is greater than or equal to 2, and where R is a substituted or unsubstituted hydrocarbon group.

* * * * *